United States Patent [19]
Krol et al.

[11] Patent Number: 5,151,817
[45] Date of Patent: Sep. 29, 1992

[54] OPTICAL FREQUENCY SECOND HARMONIC GENERATOR

[75] Inventors: Denise M. Krol, Murray Hill; Jay R. Simpson, Fanwood, both of N.J.

[73] Assignee: AT&T Bell Laboratories, Murray Hill, N.J.

[21] Appl. No.: 697,054

[22] Filed: May 8, 1991

[51] Int. Cl.⁵ .................................. G02F 1/37
[52] U.S. Cl. ..................... 359/328; 372/6; 372/22; 385/122
[58] Field of Search .............. 372/22, 21, 6; 359/326, 359/328; 385/122

[56] References Cited

U.S. PATENT DOCUMENTS

| | | | |
|---|---|---|---|
| 4,666,247 | 5/1987 | MacChesney et al. | 350/96.34 |
| 5,084,881 | 1/1992 | Farries et al. | 372/6 |

OTHER PUBLICATIONS

E. V. Anoikin et al, "Photoinduced second-harmonic generation in gamma-ray-irradiated optical fibers", 15 Optics Letters, pp. 834-835, (Aug. 1, 1990).

E. Snitzer, 148 Journal of the Less Common Metals, pp. 45-58 at pp. 55-57 (1989).

N. B. Baranova et al, "Extension of holography to multifrequency fields", JETP Lett., 45, pp. 717-719, (Jun. 1987).

E. M. Dianov et al, "Problem of the photoinduced second harmonic generation in optical fibers", Sov. J. Quantum Electron, 19, pp. 575-576, (May 1989).

D. Z. Anderson, et al, "Model for second-harmonic generation in glass optical fibers based on asymmetric photoelectron emission from defect sites" Optics Letters, vol. 16, No. 11, pp. 796-798, (1991).

*Primary Examiner*—James W. Davie
*Attorney, Agent, or Firm*—Glen E. Books

[57] ABSTRACT

Applicants have discovered photo-induced second harmonic generation in rare earth doped glass bodies free of germanium. Moreover, applicants have discovered that multivalent rate-earth doped glass bodies can be made with conversion efficiency of second harmonic generation in excess of $10^{-3}\%$ per watt, exceeding the reproducible efficiency of germanium doped glass. In accordance with the invention, a light source of a desired frequency comprises a body of glass doped with a multivalent rare earth element, an optical input source of light at one-half the desired frequency, and utilization means for receiving light passing through said body and utilizing light at the desired frequency.

9 Claims, 1 Drawing Sheet

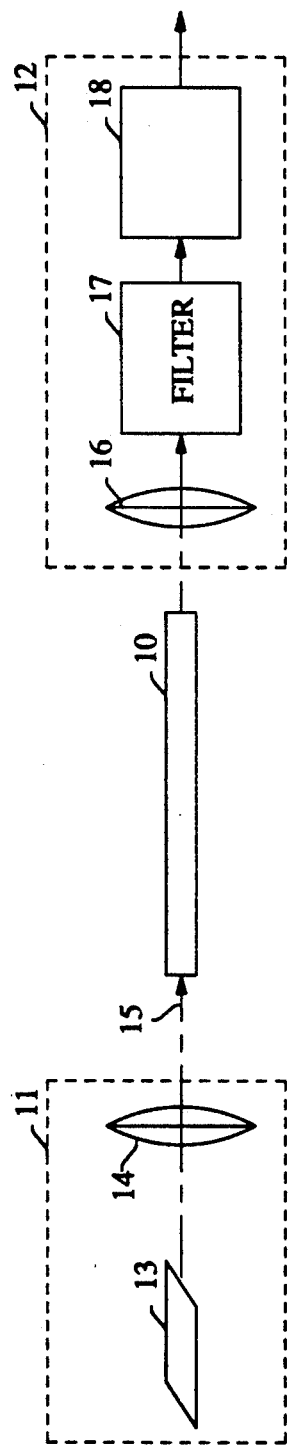

OPTICAL FREQUENCY SECOND HARMONIC GENERATOR

FIELD OF THE INVENTION

This invention relates to a second harmonic generator and, in particular, to a glass optical frequency second harmonic generator capable of generating visible light output in response to an infrared input.

BACKGROUND OF THE INVENTION

There is considerable interest in photo-induced second harmonic generation for use in light sources for optical data storage. The phenomenon of second harmonic generation, which essentially doubles the frequency of an input beam, is useful in a frequency doubled light source. Of particular interest are second harmonic generators which can convert the infrared outputs of semiconductor lasers into short wavelength visible light in the green and blue portion of the spectrum. Higher frequency light not only can carry more information but also can be used to store and read information in correspondingly higher densities.

Photo-induced second harmonic generation has been observed in glass doped with germanium. The phenomenon has generally been attributed to defects produced by the germanium dopants. The reproducible efficiencies have been less than about $10^{-3}\%$ per watt and are generally considered too low for use in practical devices.

SUMMARY OF THE INVENTION

Applicants have discovered photo-induced second harmonic generation in rare earth doped glass bodies free of germanium. Moreover, applicants have discovered that multivalent rare-earth doped glass bodies can be made with conversion efficiency of second harmonic generation in excess of $10^{-3}\%$ per watt, exceeding the reproducible efficiency of germanium doped glass. In accordance with the invention, a light source of a desired frequency comprises a body of glass doped with a multivalent rare earth element, an optical input source of light at one-half the desired frequency, and utilization means for receiving light passing through said body and utilizing light at the desired frequency.

BRIEF DESCRIPTION OF THE DRAWING

The advantages, nature and various additional features of the invention will appear more fully upon consideration of the illustrative embodiments now to be described in detail in connection with the accompanying drawings which is a schematic cross section of a second harmonic generator in accordance with the invention. It is to be understood that this drawing is for purposes of illustrating the concepts of the invention and is not to scale.

DETAILED DESCRIPTION

Referring to the drawing, there is illustrated in schematic cross section a second harmonic generator in accordance with the invention. In essence, the generator comprises a body of glass 10 doped with a multivalent rare earth element, such as cerium, an optical input source 11 for applying to the body an optical input beam at a first frequency f, and an output utilization means 12 for utilizing an output beam having a frequency 2f essentially twice the frequency of the input beam. The glass body 10 contains a periodic variation of its second order optical susceptibility $\chi^{(2)}$ as described in greater detail below. The conversion efficiency, measured as the percentage of input frequency light converted to light of doubled frequency, per watt of input signal is at useful levels exceeding $10^{-3}\%/watt$. In a preferred embodiment, the glass body 10 is an optical fiber doped with cerium, the input source 11 comprises a semiconductor laser 13 and coupling means such as a lens 14 for coupling a beam 15 into body 10. The utilization means can comprise an output coupler such as lens 16, means for selectively removing light of frequency f such as filter 17, and an optical disk reader 18 for utilizing light of frequency 2f. In this arrangement the device acts as a light source.

The fabrication and structure of the invention can be understood in greater detail by consideration of the following specific example. A cerium-doped, single mode optical fiber is made using the apparatus and technique described in U.S. Pat. No. 4,666,247 entitled "Multiconstituent Optical Fiber". The fiber is similar to Example 2 in the '247 patent except the fiber has a 3.6 micron diameter core of cerium-doped alumino-silicate glass surrounded by an inner cladding of fluorine doped silica to a diameter of 9.3 microns, and an outer cladding of silica to a diameter of 125 microns. The core is 7 mole % aluminum oxide, 93 mole % silica and 0.008 wt. % cerium oxide. The core has an index of refraction 0.010 greater than silica while the inner cladding is 0.004 less than silica, so the difference in index of refraction, $\Delta n$, between the core and the cladding, is 0.014.

The fiber is cut to a 40 cm. The ends are stripped and cleaved, and each end of the specimen is mounted in a brass fiber chuck consisting of a brass cylinder having a radial slit into which the fiber is placed. The chucks are then placed in optical mounts.

The optical input source is a mode-locked Nd:YAG laser for emitting 1.06 micrometer light at 100 picosecond pulses at a repetition rate of 76 mHz. Light from the laser was focussed onto one end of the fiber by a 10× microscope objective lens. In addition, for reasons which will be explained, a KTP doubling crystal was placed between the laser and the lens so that the light initially entering the crystal was a mixture of 1.06 micrometer and 0.532 micrometer light. At the output end of the fiber a second 10× microscope objective lens coupled light from the fiber.

The operation of the device can be considered in two stages: a conditioning stage in which the fiber is endowed with a periodic variation in its second order optical susceptibility $\chi^{(2)}$ (and thus conditioned to operate as a second harmonic generator) and a generator stage wherein the fiber acts as a generator. In the conditioning stage the fiber is subjected to light from the laser which has passed through the KTP doubling crystal. The fiber is therefore subjected to a beam containing both a 1.06 micrometer component and 0.532 micrometer component with a phase relation between the two components which, at any point along the optical path, does not fluctuate in time. This exposure conditions the fiber to act as a second harmonic generator. After 50–60 minutes, the amount of second harmonic light generated in the fiber gradually builds up to a sufficient level that the higher frequency light from the doubling crystal can be filtered out prior to input, but second harmonic generation within the fiber will continue to grow. After 2–10 hours (preferably about 6 hours) continued exposure to the 1.06 micrometer laser beam, conditioning is optimal, and a relatively constant power level of second harmonic is reached. In the generator stage, with no repetition of the conditioning step, 1.06 micrometer input into the conditioned fiber will result in an output of both 1.06 micrometer light and 0.532 micrometer green light at twice the input frequency. In the generator stage the input power can be at much lower levels than those used in the conditioning stage.

Measurements of the exemplary structure show that for an input peak power of 200 W, the green light output peak power is about 3 W. These measurements correspond to a conversion efficiency of 1.5%, or about $10^{-2}\%$ per watt of input.

While the theory behind this phenomenon is not well understood, applicants offer the following as their current belief. It is to be understood that the working of the device has been demonstrated, so its workability as a frequency doubler does not depend upon the correctness of the theory.

The application of a high intensity beam together with its second harmonic during the conditioning stage induces in the glass a periodic variation in the polarization of the medium. Specifically, the light induces a periodic variation in the second order susceptibility component $\chi^{(2)}$. Thus the conditioning step produces in the glass a periodic dc electric field variation of sufficient magnitude and proper periodicity to generate a second harmonic of the input beam.

There are two important requirements for the conditioning step. First, the conditioning must induce a macroscopic $\chi^{(2)}$ component, i.e. the conditioning must induce an asymmetry such as a macroscopic polarization or alignment of dipoles in the glass. Second, the induced $\chi^{(2)}$ must be periodic with the right periodicity for phasematching between the fundamental and second harmonic beams. Specifically the wavevector $\overline{K}$ of the $\chi^{(2)}$ grating must satisfy the condition $\overline{K} = 2\overline{k}_\omega - \overline{k}_{2\omega}$, where $\overline{k}_\omega$ and $\overline{k}_{2\omega}$ are the wavevectors of the fundamental and secondharmonic light in the glass. In fused silica with $\omega$ corresponding to a wavelength of 1.06 micrometers, $\overline{K}$ is typically of the order of 50 micrometers.

The $\chi^{(2)}$ grating is believed to be induced by a nonlinear optical interaction creating a periodic dc electric field $P_{dc}$ proportional to $E_\omega^2 E_{2\omega}$. $P_{dc}$ is created by a periodic photocurrent which is the result of interference between a one-photon ionization at $2\omega$ and a two-photon ionization at $\omega$. Since the resulting dc field is produced by fields at $\omega$ and $2\omega$, it has the right phasematching periodicity for second harmonic generation via the electric field induced second harmonic generation mechanism $\chi^{(2)} = \chi^{(3)} P_{dc}$.

An important ingredient for the success of this model is the presence of electronic states in the band gap from which electrons can be optically excited into the conduction band. Ions that should give rise to such states are ions of the multivalent rare earth elements such as Ce, Eu, Yb, Tb, Pr and Sm. It is believed that other multivalent elements such as titanium, antimony, manganese, arsenic and iron can also give rise to such states. The tendency of these elements to easily change valence is equivalent to their states being close to the Fermi level.

It is to be understood that the above described embodiments are illustrative of only a few of the many possible specific embodiments which can represent applications of the principles of the invention. Thus numerous and varied other arrangements can be made by those skilled in the art without departing from the spirit and scope of the invention.

We claim:

1. A source of light of a desired frequency 2f comprising:
   a waveguiding body of glass doped with cerium;
   an optical input source of light at frequency f for directing an input beam into said body of glass; and
   utilization means for receiving light passing through said body and utilizing light at frequency 2f.

2. The source of claim 1 wherein said body of glass is an optical fiber.

3. The source of claim 1 wherein said optical input source is a semiconductor laser.

4. The source of claim 1 wherein said utilization means is an optical disk reader.

5. The source of claim 1 wherein said body of glass is free of germanium.

6. The source of claim 1 wherein said utilization means comprises means for selectively utilizing light at frequency 2f.

7. A source of light of a desired frequency 2f comprising:
   a single mode optical fiber of glass doped with an element chosen from the group consisting of Ce, Eu, Tb, Pr and Sm and containing periodic variations of its second order optical susceptibility whereby said glass converts light of frequency f to light of a second harmonic frequency 2f; and
   an optical input source of light at frequency f for directing an input beam into said optical fiber through said periodic variations.

8. The source of claim 7 wherein said body of glass is a cerium doped optical fiber free of germanium.

9. The source of claim 7 wherein said body of glass is a cerium doped optical fiber and said optical input source is a semiconductor laser.

* * * * *